United States Patent [19]

Davies et al.

[11] E Re. 29,847

[45] Reissued Nov. 28, 1978

[54] PACKING MACHINES

[75] Inventors: Robert W. Davies; Leonard Thornton; Maxwell F. Veness; Leonard H. Calver, all of London, England

[73] Assignee: Molins Limited, London, England

[21] Appl. No.: 853,959

[22] Filed: Nov. 22, 1977

Related U.S. Patent Documents

Reissue of:

[64] Patent No.: 4,036,117
Issued: Jul. 19, 1977
Appl. No.: 703,383
Filed: Jul. 7, 1976

U.S. Applications:

[62] Division of Ser. No. 443,938, Feb. 19, 1974, Pat. No. 3,977,157.

[30] Foreign Application Priority Data

Feb. 16, 1973 [GB] United Kingdom ..... 7858/73

[51] Int. Cl.[2] ..... B31B 1/46

[52] U.S. Cl. ..... 93/51 R

[58] Field of Search ..... 53/191, 192, 207, 230, 53/234; 93/12 R, 12 C, 51 HW, 54.2, 51 R, 47

[56] References Cited

U.S. PATENT DOCUMENTS 3,344,580 10/1967 Griner ..... 93/51 R

*Primary Examiner*—John Sipos

*Attorney, Agent, or Firm*—John C. Smith, Jr.

[57] ABSTRACT

A packing machine for cigarettes comprises a carton blank reservoir, a carton blank hopper, a blank feeding device, a blank transfer conveyor, a bundle drum, a packet forming drum, a packet stacking unit and a packet orientation unit.

Carton blanks are removed one at a time from the hopper by a suction device and fed intermittently by the transfer conveyor to a position adjacent a pocket in the packet forming drum, the blank then being pushed into the pocket so as to partially form it into a carton. While on the transfer conveyor adhesive is applied to certain parts of the blank and initial folding of the blank takes place.

Foil wrapped bundles of cigarettes are pushed, two at a time, into pockets provided on the bundle drum and transferred one at a time into a partially formed carton contained in a pocket on the packet forming drum. Further folding and gumming of the partially formed carton takes place on the packet forming drum and the carton is completed on being pushed from the packet forming drum into the stacking unit, in which the adhesive is reheated and the packet passes between spring loaded walls to ensure it is of the required external dimensions. The completed packets are then fed onto the orientation unit which presents each packet in the correct orientation for further operations to be carried out.

7 Claims, 16 Drawing Figures

BD
205
218
343
FD
315
325
333
335
332
324
326
309
329
331
327
344
F
357
359
360
G
325
324
315
316
314
312
326
314
358
320
V
322
309
310
311
313
H
511
586
588
584
318
323
313

PACKING MACHINES

Matter enclosed in heavy brackets [ ] appears in the original patent but forms no part of this reissue specification; matter printed in italics indicates the additions made by reissue.

This application is a divisional of our application Ser. No. 443,938 filed Feb. 19, 1974 now U.S. Pat. No. 3,977,157.

This invention concerns improvements in or relating to packing machines, and in particular to machines which are suitable for packing cigarettes.

When packing cigarettes certain operations are carried out, namely, a bundle of cigarettes is first formed, the bundle is then wrapped in foil, and a packet blank is folded and stuck around the wrapped bundle to form a packet containing the bundle.

The present invention is concerned with machines which will fold a packet blank around a wrapped bundle and adhesively secure the blank to form the cigarette packet, the bundle having previously been formed and wrapped on another machine or machines. However, the invention is not limited to machines for the packing of bundles of cigarettes, but could be embodied in machines for packing other articles.

According to the invention, there is provided apparatus for folding a packet blank, comprising a cyclically-movable support for conveying blanks one at a time past stationary folder members so that successive edge portions of the blank protruding from the support are folded by engagement with successive ones of the stationary members, in which said support comprises a platform having at least two relatively-movable portions, drive means being provided for moving each of said portions in timed relation to the movement of the other portion or portions so that initially both or all portions of the support are aligned to receive a flat blank and move said blank past a first stationary folder member disposed to engage and fold an edge portion of the blank projecting from one portion of the platform, whereafter said one portion of the platform stops while motion of at least one other portion of the platform continues past another stationary folder member disposed to engage and fold another edge portion of the blank projecting from said other portion of the platform.

A preferred embodiment of the invention will now be described, by way of example only, with reference to the accompanying drawings in which:

FIG. 1 is a diagrammatic representation of a cigarette packing machine embodying the invention, FIG. 2 illustrates one form of packet blank for use on the machine of FIG. 1, prior to being folded, FIGS. 3 and 4 together show a front view, partly in section, of apparatus for forming a blank into a cigarette packet and inserting a bundle of cigarettes into the packet during the forming operation, FIG. 5 is a section of the line V—V of FIG. 3, FIG. 6 is a plan view of part of the apparatus of FIG. 4, viewed as indicated by the line VI—VI of that Figure and drawn to a larger scale.

GENERAL DESCRIPTION

Figure 1:
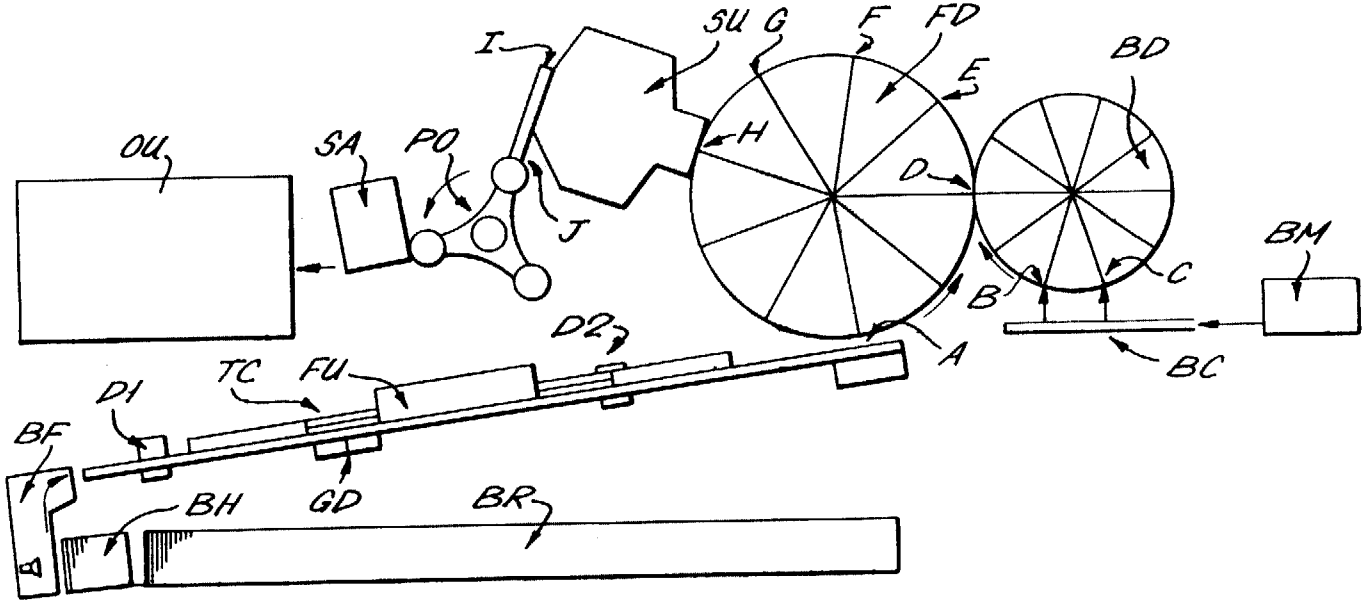
Figure 2:
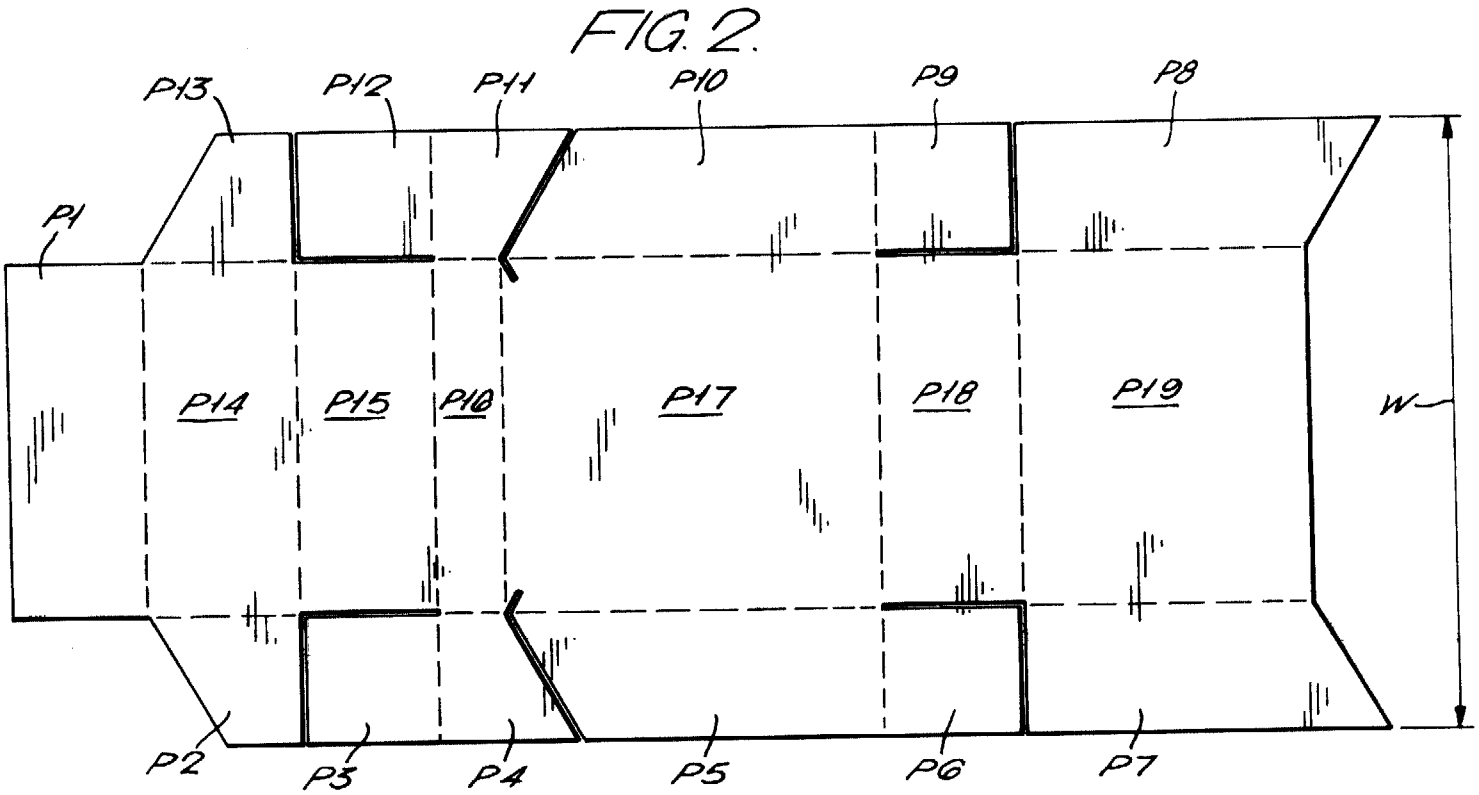

The machine to be described requires a supply of wrapped bundles of cigarettes and, in FIG. 1, reference BM indicates any convenient apparatus for grouping cigarettes into suitable bundles (e.g. each comprising three rows of cigarettes), and wrapping them in metal foil. The apparatus BM forms no part of the present invention and will not be further described.

The wrapped bundles are then fed, by a conveyor BC, to the input of the packing machine embodying the present invention.

This machine comprises basically the following units; a blank reservoir BR, a blank hopper BH, a blank feeding device BF, a blank transfer conveyor TC, a bundle drum BD, a packet forming drum FD, a stacking unit SU, and a packet orientation unit PO.

Blanks are removed one at a time from the hopper BH by the device BF and fed on to the conveyor TC, as shown by the arrow. The blanks are fed intermittently to the right (as viewed in FIG. 1) by the conveyor TC until they reach and stop at a position A adjacent the drum FD. At spaced locations along the conveyor TC detectors D1, D2 are provided for detecting whether a blank is missing, or misaligned with respect to the conveyor TC. Between the detectors D1 and D2 is provided a device to print identification marks on the blanks and, downstream of the detector D1, a gumming device GD is provided by which portions of the blank have adhesive applied to them. Between the device GD and the detector D2 is a folding unit FU which folds one of the portions of the blank to which adhesive has been applied into contact with another portion thereof so as to become adhesively secured thereto. Whilst passing through the unit FU the blanks are moved continuously.

The drum BD is adapted to receive wrapped bundles from the conveyor BC two at a time, at positions B and C, and to rotate intermittently in a clockwise direction in steps of 36°, the arrangement being such that two bundles of cigarettes are transferred from the conveyor BC to the drum BD after every second movement of the drum BD. Each time the drum BD comes to rest a single wrapped bundle will be at position D, in the drum BD, facing the drum FD.

The blank at position A is transferred from the conveyor TC into one of 9 pockets in the periphery of the drum FD which is driven intermittently, in an anti-clockwise direction, in synchronism with conveyor TC and drum BD, in steps of 40°. During its transfer into one of the pockets on the drum FD the blank is folded so that a packet is partially formed in the pocket on drum FD. After transfer of the blank to the drum FD the latter is rotated anti-clockwise, and each time it comes to rest a partially formed packet in a pocket on drum FD will be at position D, facing a wrapped bundle in drum BD, and the bundle is then pushed from the drum BD into the partially formed packet on drum FD.

The drum FD then continues to rotate in 40° steps in an anti-clockwise direction and while it is moving between, and is stationary at, positions E, F and G, further folding and adhesive applying operations are performed on the packets each of which now contains a wrapped bundle of cigarettes. After a further 40° step from position G each packet in turn is brought to rest at position H adjacent the stacking unit SU and, whilst the drum FD is stationary, is ejected from the drum FD into the unit SU. As this ejection takes place, final folding operations are performed on the packet, which complete the formation of the packet round the wrapped bundle of cigarettes. As each completed packet is pushed into the unit SU it abuts the packet which was ejected from the preceding pocket of the drum FD. In this way a stack of abutting packets is formed in the unit SU, the arrangement being such that as a packet is pushed into the unit SU at position H, a packet is pushed out of the unit SU at position I. Whilst in the unit SU the packets pass between heaters, and spring loaded plates ensure that when each packet emerges at position I it is of the correct dimensions.

From position I each packet is moved past position J into one of three holders carried on the unit PO, which is rotated intermittently in an anti-clockwise direction in 120° steps to carry each packet in turn to a position where the packet is pushed out of the unit PO and fed to further apparatus SA for applying a stamp to the packet and thence to apparatus OU for overwrapping the packet in transparent material. The apparatuses SA and OU form no part of the present invention and will not be described further. The unit PO may also be used as a means for ejecting faulty packets.

PACKET FORMING DRUM

The packet forming drum FD, its associated devices, and the stacking unit SU will now be described in detail with reference to FIGS. 3 to 9.

A pair of plates 85 extend a short distance to the right (as viewed in FIG. 4) of the position A, and near the right hand end thereof a plate 270 is fixed to, and extends across, the width of the plates 85. Fixed to the underside of the plates is a box 271, an aperture 272 being provided in the top of the box 271 and in the plates 85.

Positioned in the box 271 are three lifting blocks 273, 274, 275, the block 274 being positioned between the blocks 273, 275 (FIGS. 4 and 6), the three blocks being movable up and down through the aperture 272, as will be described later. The centre block 274 is carried on a slide 276 which is arranged to be moved up and down between two pairs of guide rollers 277, 278. Pivotally connected, at one end, to the slide 276, is a short link 279, the other end of which is attached to one arm 280 of a bell crank lever pivoted at 281. The other arm 282 of the bell-crank lever carries a roller 283 which engages in a slot 284 formed in one face of a box cam 284a fixed to a shaft 285 which is continuously rotated in a clockwise direction, as viewed in FIG. 4.

Also pivotally connected to the slide 276 is one end of an L-shaped arm 286. The two blocks 273, 275 are fixed to a common carrier 287 having a downwardly depending lug 288 to which one end of a connecting link 289 is pivotally attached. The other ends of the arm 286 and link 289 are carried on a common pivot which carries a roller 290. The roller 290 is arranged to engage in a slot 291 formed in a block 292 fixed to a partition (not shown) in the box 271. Fixed respectively to separate shafts 293, 294 (FIG. 6) are two lifting plates 295, 296, the shafts 293, 294 being driven continuously in a clockwise direction as viewed in FIG. 4.

Figure 4:
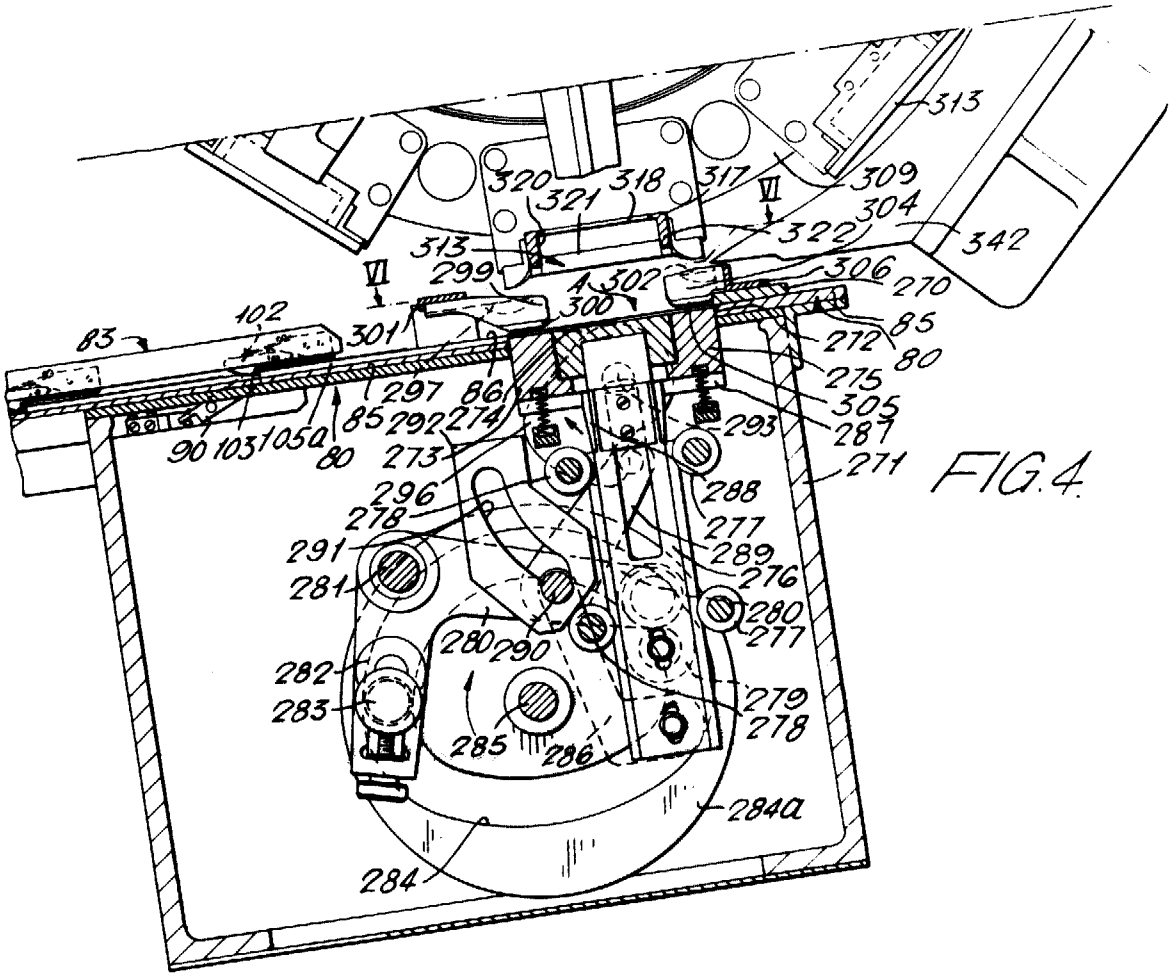
Figure 6:
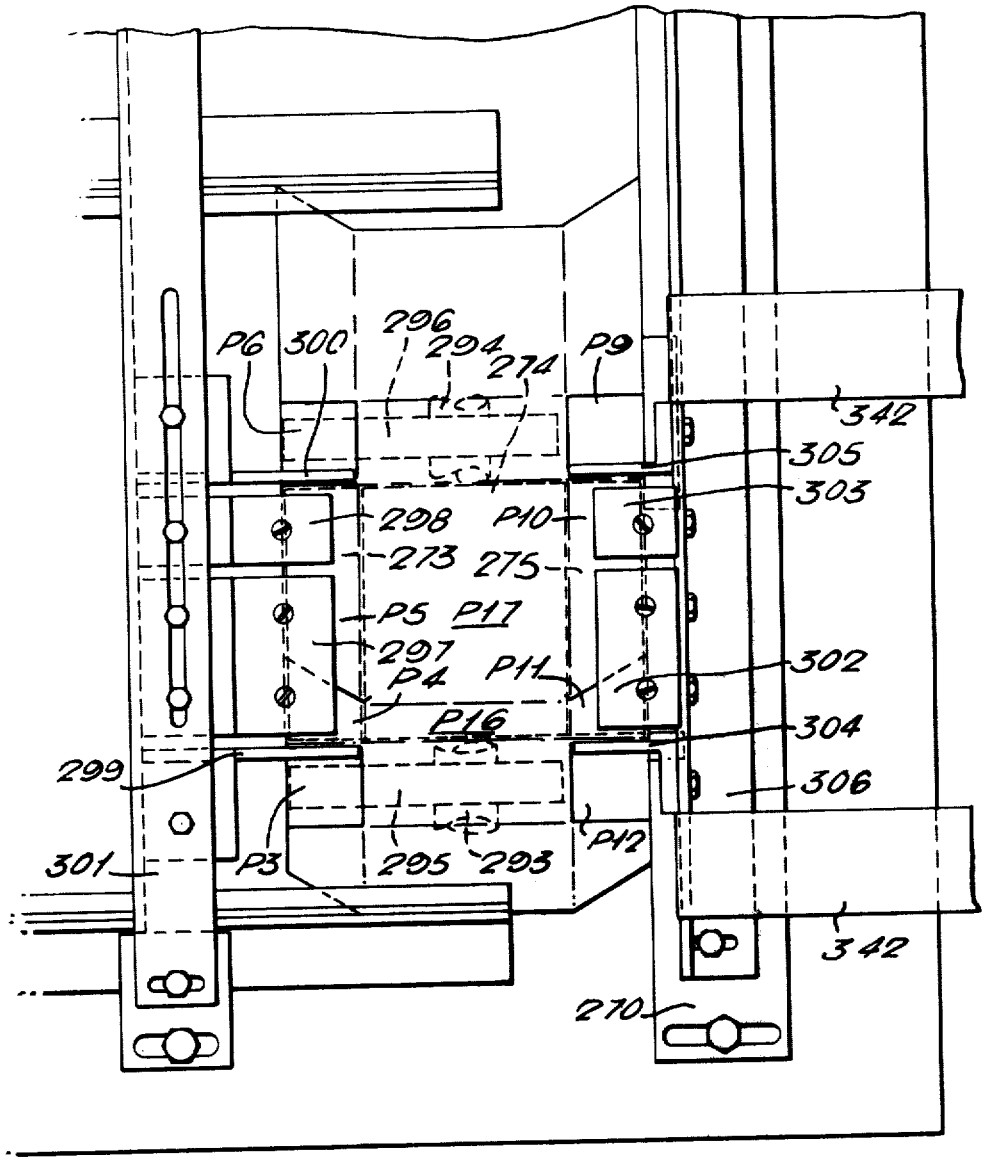

Positioned a short distance above the fixed frame 80, so that they extend over the lifting block 273 are two folders 297, 298 and two tuckers 299, 300 (FIGS. 4 and 6). The folders are arranged to extend in a plane parallel to the fixed frame 80 and the tuckers extend downwardly, at right angles to the folders, as shown in FIG. 4, both the folders and tuckers being carried on a bridge plate 301 which extends across the width of the fixed frame 80. Similar pairs of folders 302, 303 and tuckers 304, 305 are arranged to extend over the lifting block 275, both the folders and the tuckers being carried on a bracket 306 fixed to the plate 270.

Figure 3:
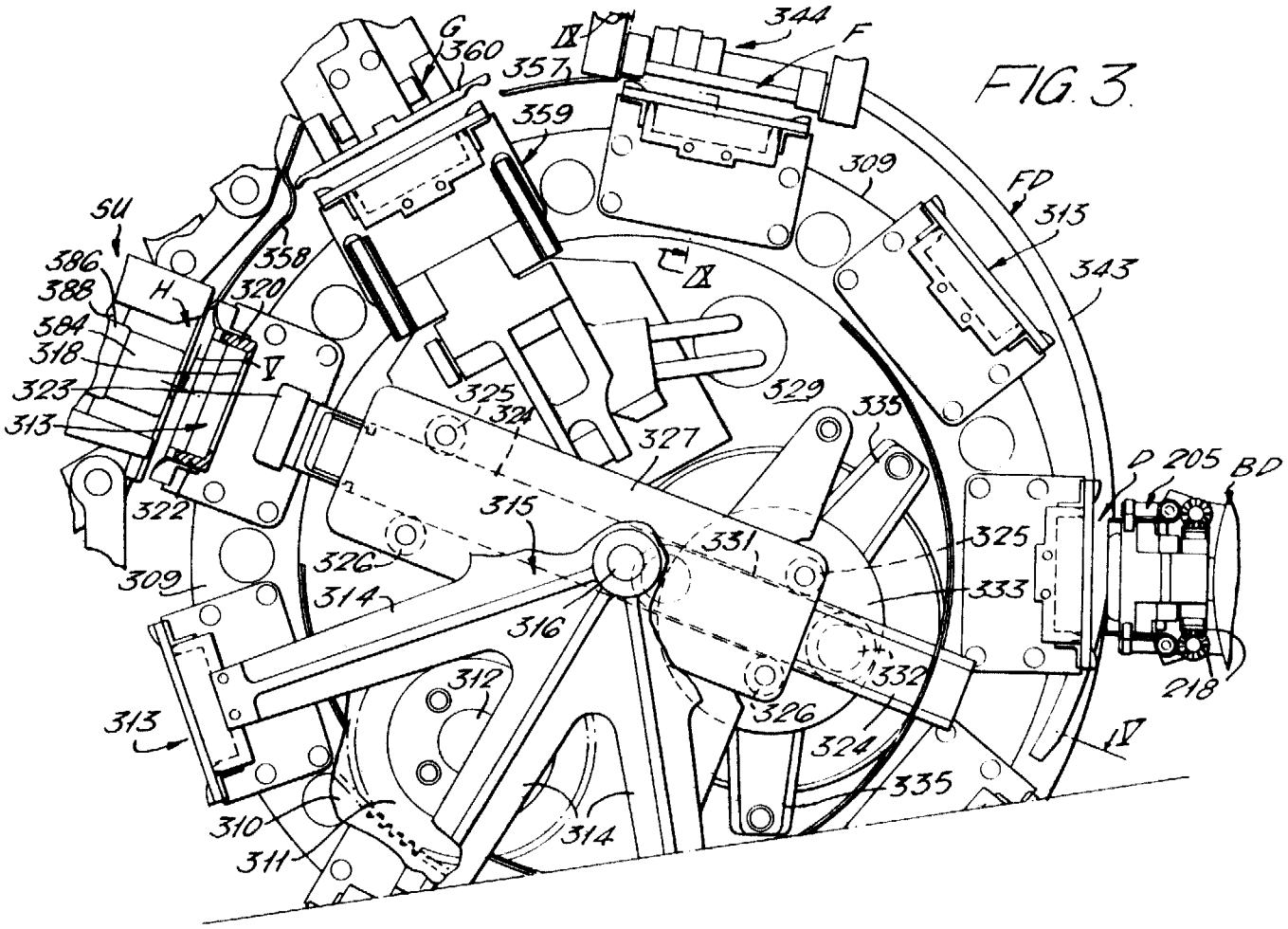
Figure 5:
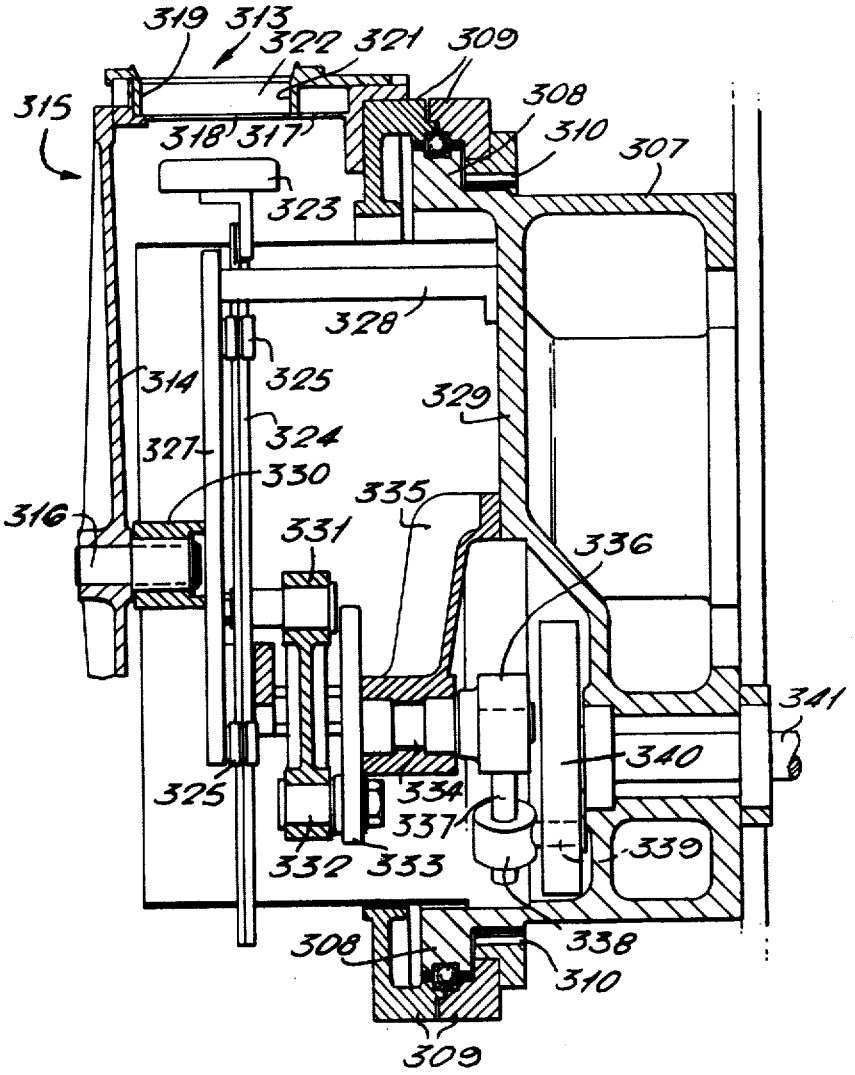

The drum FD includes a structure 307 (FIG. 5) non-rotatably secured to a fixed part of the machine. Rotatably mounted on a flange 308, formed on the structure 307, is an annular carrier 309, made up of two coaxial annular parts which are fixed together by bolts (not shown). Fixed to the carrier 309 is a ring 310 having gear teeth formed on its inner surface (FIGS. 3 and 5). The teeth of the ring 310 mesh with the teeth of a gear wheel 311 fixed to a shaft 312 (FIG. 3) which is driven intermittently from any convenient form of drive means (not shown). Fixed to, and equally spaced round, the carrier 309, are nine pockets 313, each of which is supported at its end remote from the carrier 309, on the outer end of one arm 314 of a nine-armed spider 315 journalled on a stub shaft 316. The arrangement is such that the carrier 309, and thus the pockets 313, are rotated aout the flange 308 by the gear wheel 311 in 40° steps in an anti-clockwise direction (as viewed in FIG. 3). Each pocket consists of a base plate 317 provided with an aperture 318, and four side walls 319, 320, 321, 322, the edges of these walls, which define the mouth of the pocket, being chamfered as shown in FIGS. 3 to 5.

A pusher 323 is provided, between the spider 315 and the carrier 309, which is arranged to be reciprocated radially of the carrier 309 so as to pass through the aperture 318 of each pocket 313 in turn. For this purpose the pusher 323 is fixed on a slide 324 which moves between two pairs of guide rollers 325, 326, rotatably mounted on a cross piece 327. The cross piece 327 is carried on a number of legs 328 which are bolted to a wall 329 (FIG. 5) of the structure 307. The cross piece 327 also provides a fixture for a hub 330 in which the stub shaft 316 is journalled. Rotatably fixed at one end, to the slide 324, is a connecting arm 331, the other end of which is journalled on a pin 332 carried on a crank disc 333. The disc 333 is fixed to the left hand end (as viewed in FIG. 5) of a short shaft 334 journalled in a boss carried on arms 335 which are bolted to the wall 329. The right hand end of the shaft 334 is formed into a block 336 which has a shaft 337 to it, the shaft extending radially outwards from the shaft 334. Slidably mounted on the shaft 337 is a bush 338 provided with a pin 339, which is journalled in a further crane disc 340, the latter being fixed to a shaft 341 driven continuously from any convenient form of drive means (not shown), the shaft 341 being offset from the shaft 334, as shown in FIG. 5.

The shaft 341 is driven in an anti-clockwise direction (as viewed in FIG. 3), and thus the cranks 340, 333 are driven in the same direction. The various parts constituting the drive to the slide 324 are so arranged that, considered in the direction of rotation of the cranks 340, 333, the pin 332 is approximately 30° in advance of the pin 339.

Also mounted between the spider 315 and the carrier 309 is a device 359 for applying lines of hot-melt adhesive to certain panels of each blank. The device 359 is constructed as described in U.S. Pat. No. 3,815,822 and will not be further described here.

Figure 9:
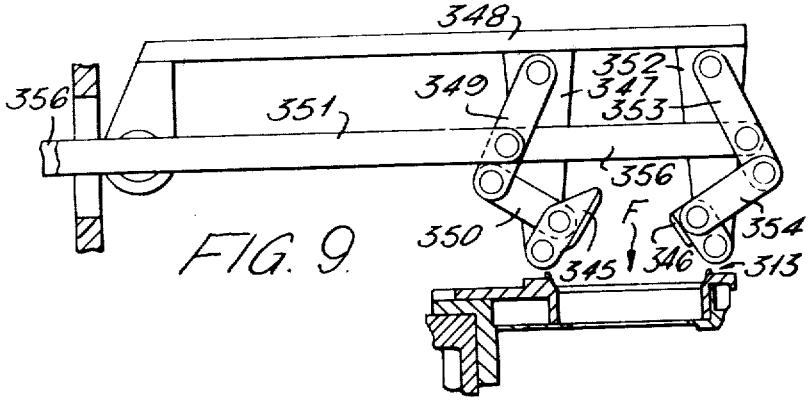
FIG. 9 is a section on the line IX—IX of FIG. 3.

Mounted outside the pockets 313, in a direction radial of the carrier 309, and extending round the drum FD over an angle of approximately 40° from the bracket 306 is a pair of arcuate plates 342 (FIGS. 4 and 6). Also mounted outside the pockets 313, and extending over an angle of approximately 80°, are a number of plough folders 343, of conventional form, only one of the folders being shown in FIG. 3. Positioned at the trailing end of the folders 343 (considered in the direction of rotation of the carrier 309) is a flap folding mechanism 344. The latter consists of two folders 345, 346 (FIG. 9). The folder 345 is pivoted to an extension 347 fixed to a frame 348. Also provided to the extension 347 is one end of a lever 349, the other end being connected to a link 350 which in turn is pivotally connected to the folder 345. Pivotally connected to the lever 349, near its connection with the link 350, is a connecting arm 351. The folder 346 is pivotally connected to a further extension 352 fixed to the frame 348. A lever 353 and link 354 are connected together in the same manner as the lever 349 and link 350. A further connecting arm 356 is pivotally connected to the lever 353. The connecting arm 351, 356 are each operated by a pair of cans (not shown) which cooperate to move the folders 345, 346 as will be described later.

Facing the adhesive applying device 359 (FIG. 3) but positioned radially outwards of the pockets 313 is a plate 360, which is movable towards and away from the pockets 313, by a pair of cams (not shown) at certain times, as will be described later.

STACKING UNIT

Figures 7, 8:
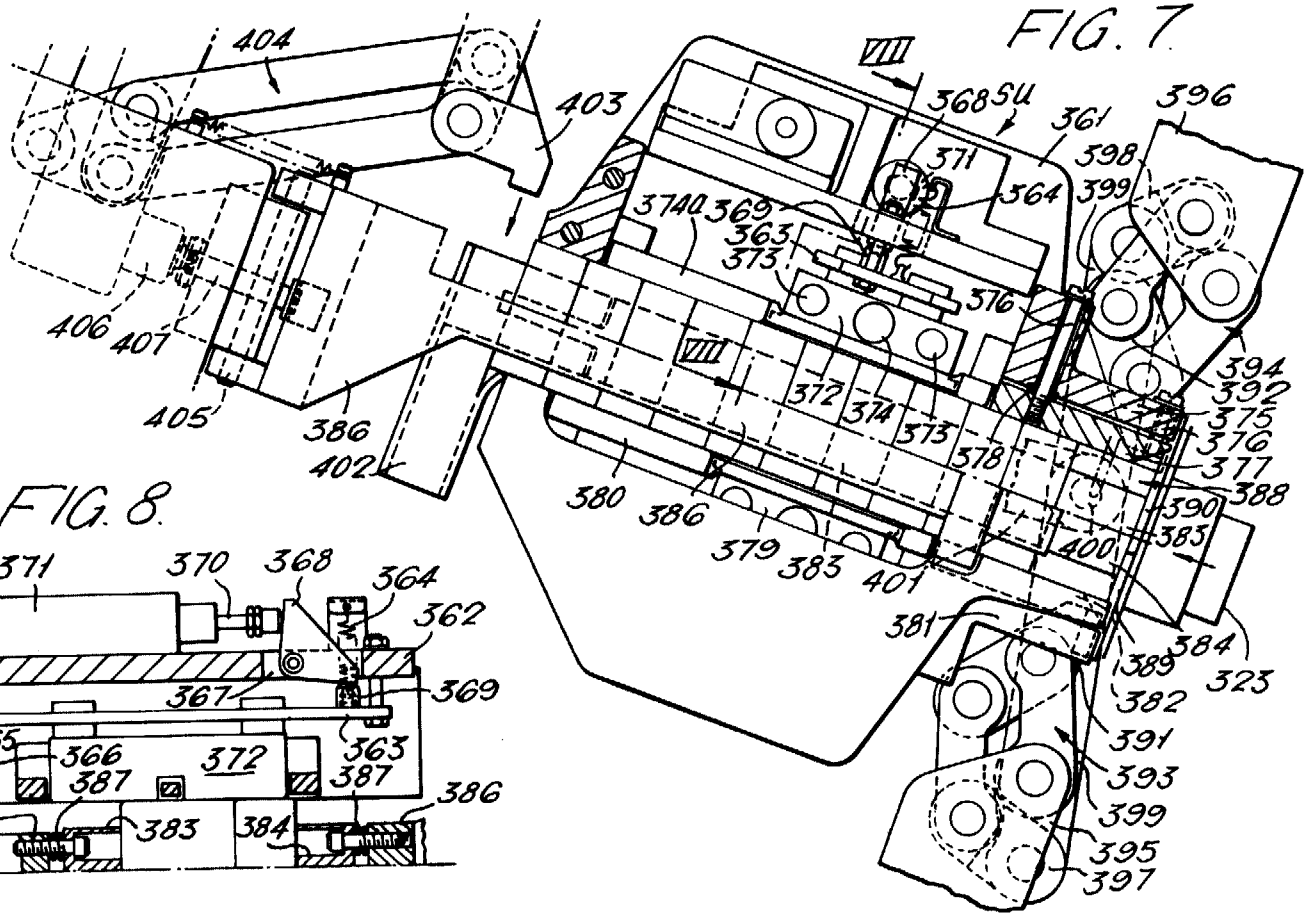
FIG. 7 is a front view, partly in section, of apparatus for ensuring that the complete packets are of the desired dimensions.
FIG. 8 is a section on the line VIII—VIII of FIG. 7.

Mounted outside the drum FD and in radial alignment with the pusher 323 is the entry end of the stacking unit SU (FIGS. 3, 7 and 8). Extending between the flap folding mechanism 344 and the plate 360 and between the plate 360 and the entry end of the unit SU are two fixed arcuate plates 357, 358 respectively.

The unit SU consists of upper and lower back plates, attached to a fixed part of the machine, of which only the upper one, indicated at 361, is visible in the drawings. Carried on the back plate 361 is a bracket 362 (FIG. 8) from which a rectangular plate 363 is supported, at one end thereof, by means of a spring 364. The other end of the plate 363 is fixed to a bracket 365 hinged at 366. Freely pivoted in a slot 367, in the plate 362, is a triangular member 368, one side of which engages a stud 369 fixed to the plate 363. A second side of the member 368 is engaged by a cap fitted to the end of the piston rod 370 of a pneumatic cylinder 371. Carried on the plate 363 is a heater block 372 provided with heater elements 373 and a thermostat 374, the heater block 372 extending through a hole in a pressure plate 374a. Also carried on the back plate 361 is an angle piece 375. Supported from the angle piece 375 by bolts 376 is a front plate 377 which is resiliently mounted with respect to the piece 375 by spring washers 378, the position of the plate 377 being determined by the bolts 376. The lower back plate carries a similar construction of parts, as just described with respect to the upper back plate 361, of which only a heater block 379, pressure plate 380, part of an angle piece 381, and front plate 382 are shown in FIG. 21.

The unit SU is also provided with two side walls 383, 384 which are carried on bolts screwed into support arms 385 and 386 respectively, the side walls 383, 384 being resiliently mounted with respect to the arms 385, 386 by means of spring washers 387 positioned between opposing faces of the walls 383, 384 and their respective support arms 385, 386 (FIG. 8). The arrangement is such that the front plates 377, 382, pressure plates 374, 380 and side walls 383, 384 form a passage 388 through which completed packets are pushed, as will be described later.

Positioned at the entry end of the unit SU is a pair of control flaps 389, 390 carried respectively on links 391, 392 which form part of two parallelogram linkages 393, 394 pivotally connected to brackets 395, 396. Short links 397, 398 are fixed, at one end, to one of the pivots on brackets 395, 396 respectively, and at the other end are pivotally connected to one end of each of a pair of operating arms 399, the latter being pivotally connected together, at their other ends, at 400. Also connected to the pivot at 400 is a lever 401 which is operated by a pairs of cams (not shown), as will be described later. The control flaps 389, 390 extend towards each other from the links 391, 392, the free ends being provided with forked fingers which mesh so that when in the position shown in FIG. 7 the flaps 389, 390 lie in the same plane.

The support arm 386 is hinged at 405 to a fixed part of the machine which carries a micro-switch 406, the arm 386 being provided with an extension 407 which engages the switch 406. The arrangement is such that when the arm 386 is swung about the hinge 405 the micro-switch 406 is operated to energise devices (not shown) which operate to cause all the packets contained in the unit SU to be ejected at a later stage (e.g. from the unit PO, to be described later).

At the exit end of the passage 388 in the unit SU (i.e. the left hand end as viewed in FIG. 7) a chute 402 is provided with extends downwardly from the unit SU as shown in FIG. 7. A plunger 403, carried on a parallelogram linkage 404, is caused to move, by a pair of cams (not shown), downwards through the chute 402 and back up along a path which takes it outside the chute.

BLANK FOLDING OPERATIONS

The operation of the apparatus shown in FIGS. 3 to 9 will now be described with added reference to FIGS. 10 to 16.

Figure 10:
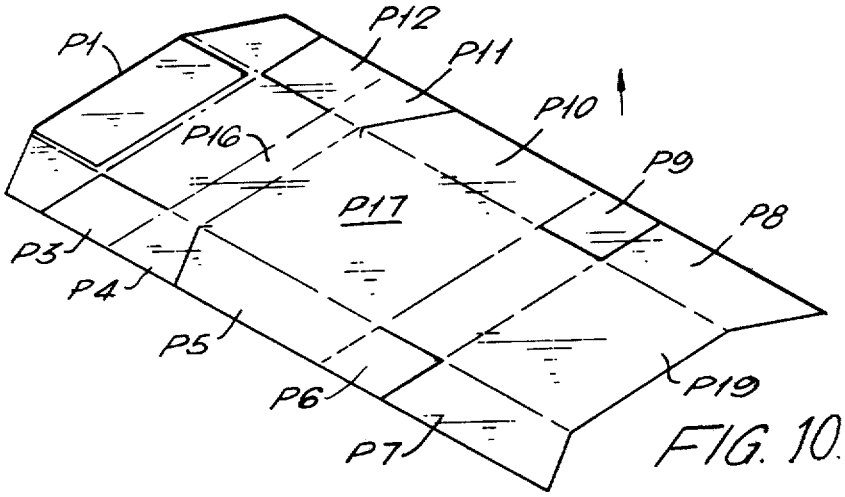
FIGS. 10 to 16 show progressive stages in the forming of a blank into a cigarette packet by the apparatus of FIG. 3.

As earlier mentioned when describing the conveyor TC, each blank in turn is delivered to the position A. With a blank in this position its leading edge (considered in its direction of movement along the conveyor TC) is abutted against the plate 270 (FIGS. 4 and 6), the panels P4, P5 being positioned above the block 273, the panels P10, P11 being positioned above the block 275, and the panels P16, P17 being positioned above the block 274. A perspective view of the blank at position A, looking up from below the blank is shown in FIG. 10.

Figure 11:
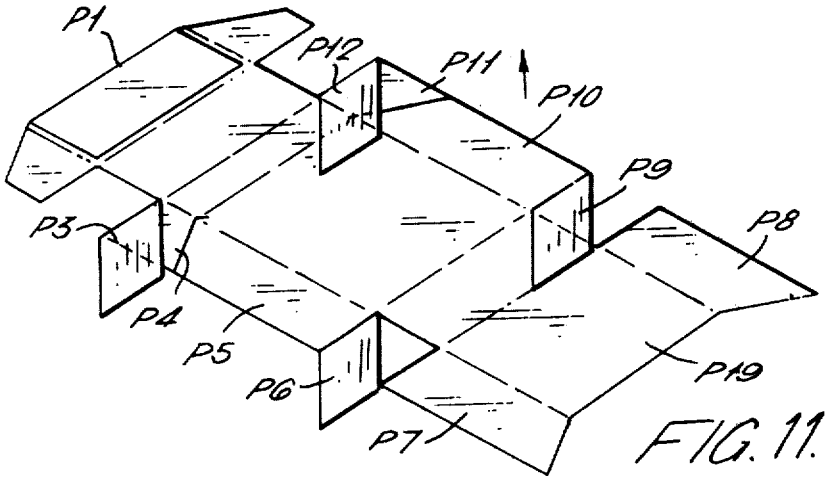

Starting with the various parts in the positions shown in FIG. 4, rotation of the box cam 284a causes (through slot 284, roller 283 arms 280, 282 and link 279) the slide 276, and thus the block 274, to move upwards. This movement of the slide causes simultaneous upward movement of the blocks 273, 275 through the arm 286, link 289, lug 288 and carrier 287, the blocks 273, 275 being constrained to move upwards in unison with the block 274 by reason of the roller 290 moving along the straight portion of the slot 291. The blocks 273, 274, 275 move upwardly through the aperture 272 and lift the blank at position A off the surface 86 of the fixed frame 80. As the blank is lifted the panels P6, P9 engage the tuckers 300, 305 respectively, and slightly later the panels P3, P12 engage the tuckers 299, 304 respectively, so that the panels P6, P9, P3, P12 are each folded downwardly through 90°, over the adjacent corners of the blocks 273, 275, as shown in FIG. 11 which is a perspective view taken from the same viewpoint as FIG. 10.

Figure 12:
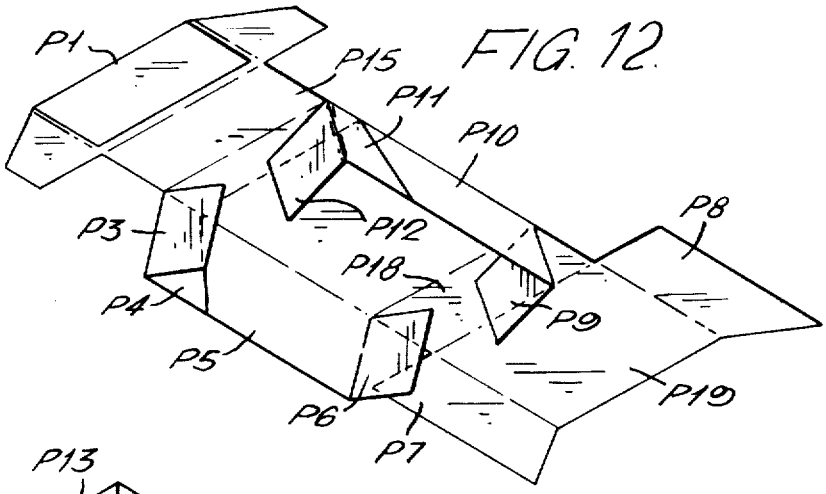
Figure 13:
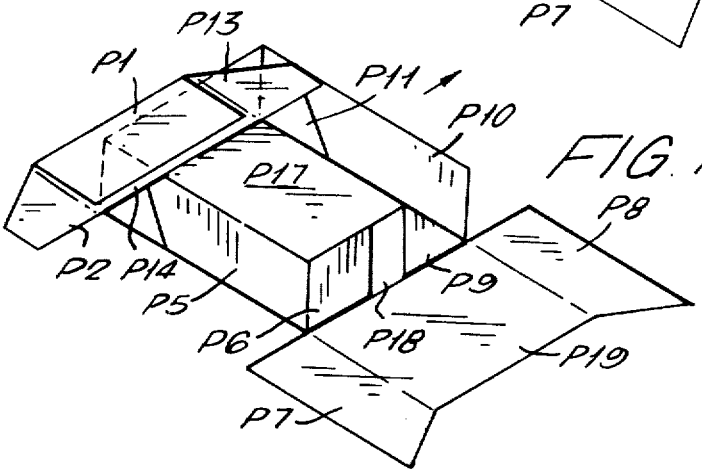
Figure 14:
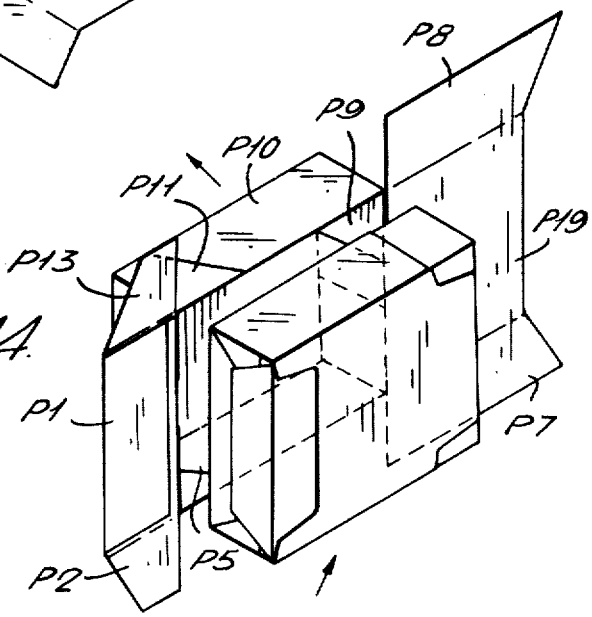

Upward movement of all three blocks, 273, 274, 275 continues until the roller 290 reaches the end of the straight vertical portion of the slot 291 and starts moving along the curved portion. The curved portion is in the form of a circular arc which is centered upon the axis of the pivotal connection between link 289 and lug 288 when that axis at the limit of its upward movement (i.e. when the roller 290 reaches the end of the straight portion of the slot 291). The block 274 continues moving upwardly, but due to the roller 290 now moving along the curved portion of slot 291, the link 289 swings about its connection with the lug 288 and the upward movement of the blocks 273, 275 is stopped. As the block 274 moves further upwards the panels P4, P5, engage the folders 297, 298 and the panels P10, P11 engage the folders 302, 303 so that the panels P4, P5, P10, P11 start to fold downwardly over the adjacent edges of the block 274. After further upward movement of the block 274 the panels P15, P18 respectively engage the walls 319, 321 of a pocket 313, of the drum FD positioned above the position A. At the same time the partly folded panels P4, P5, engage the wall 320 of the pocket, and the partly folded panels P10, P11 engage the wall 322 of the pocket. FIG. 12 shows a perspective view of a blank in this position, with the panels P4, P5, P10, P11 each having been folded through an angle of approximately 70°.

The block 274 continues its upward movement until the panels P16, P17 engage the base plate 317 of the pocket, by which time the panels P4, P5, P10, P11, P15 and P18 have all been folded through 90° and the blank is fully in the pocket 313. The blank is now a partly formed packet and such a packet is shown in perspective in FIG. 13.

On continued rotation of the box cam 284a the block 274 starts to move downwardly, and the roller 290, after moving back along the curved portion of the slot 291, enters the straight portion again and all the blocks 273, 274, 275 return to the position shown in FIG. 3.

The drum FD is now rotated, through the gear wheel 311 and ring gear 310, through an angle of 40° and then stopped. As the pocket 313, now containing a partly formed packet, starts to move the panels P1 (which is stuck to panel P14) P2 and P13 engage the lower (as viewed in FIG. 6) plate 342 and the panels P7, P19 and P8 engage the upper (as viewed in FIG. 6) plate 342, the plates 342 being provided to keep the flaps which engage them in the position shown in FIG. 13.

To ensure that the panels P1, P2, P13 and P7, P19, P8 do not foul the edges of the respective plates 342 the lifting plates 295, 296 are rotated, their shape being such that they contact and lift the panels P1, P19 respectively.

After a further stepwise movement of the drum FD the pocket 313 containing the partly formed packet is brought to rest at position D, the open front of the partly formed packet facing a wrapped bundle of cigarettes in the drum BD. A partly formed packet and a wrapped bundle of cigarettes are shown in this relationship in FIG. 14.

Figure 15:
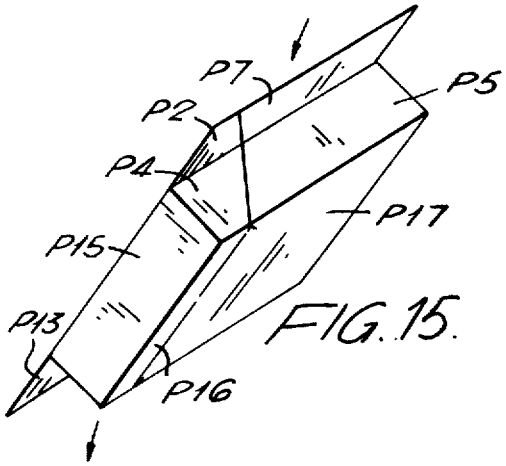

After two further stepwise movements of the drum FD the partly formed packet is brought to rest at position F (FIGS. 1, 3 and 9) adjacent the flap folding mechanism 344. During these movements of the partly formed packet from position D to position F the panels P2, P14, P13 and the panels P7, P19, P8 engage the plough folders 343 which progressively fold the flaps about the crease lines between each panel P14, P19 and the adjacent panels P15, P18 respectively, through an angle of approximately 110°. After the partly formed packet has been brought to rest at position F, the folders 345, 346 (FIG. 9) are caused to engage the panels P19, P14 respectively by rotation about their respective pivots on the extensions 347, 352, by operation of the connecting arms 351, 356 respectively. The cams which cause this rotation of the folders 345, 346 are so shaped that the folder 345 starts to move before the folder 346, so that the panel P19 is folded into engagement with the bundle of cigarettes slightly before the panel P14, to avoid any interference between the panels. After both panels P14, P19 have been folded against the cigarette bundle, the drum FD is rotated through a further stepwise movement to bring the partly formed packet to rest at position G (FIGS. 1 and 3). Whilst moving from position F to position G the arcuate plate 357 holds the panels P14, P19 in the position to which they were moved by the folders 345, 346. FIG. 15 shows a perspective view of a partly formed packet as it is when at position G.

Whilst the partly formed packet is held stationary at position G the gluing device 359 and plate 360 are moved towards each other to engage opposite faces of each of the panels P4, P5, P10, P11. The gluing device 359 is provided with nozzles through which hot-melt adhesive is caused to flow on to the panels P2, P5, P10, P13, as described in detail in the above-mentioned U.S. patent, the plate 360 forming an anvil against which the panels are pushed as the adhesive is applied.

After one more stepwise movement of the drum FD the partly formed packet is brought to rest at position H, the arcuate plate 358 holding the panels P14, P19 in place during this movement. At position H the partly formed packet is in radial alignment with and positioned between the pusher 323 and the entrance to the passage 388 in the stacking unit SU. The pusher 323 is reciprocated radially of the drum FD, to push a partly formed packet from each pocket 313 in turn into the unit SU, by the crank disc 333 driven by shaft 334, a cyclic speed variation being imposed on the reciprocating movement, due to the bush 338, carried on crank disc 340, sliding towards and away from the rotational axis of the shaft 334, this sliding movement being in turn, due to the fact that the shafts 334 and 341 are not in axial alignment. Thus, although the shaft 341 is driven continuously at a constant speed, the shaft 334 is driven continuously at a cyclically varying speed.

Figure 16:
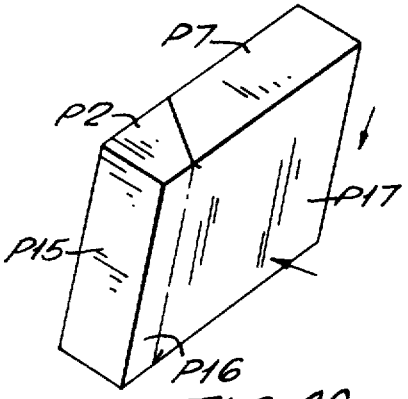

When the partly formed packet has been brought to rest at position H the pusher 323 is already moving radially outwards of the drum FD at a decreasing speed. Just before the shaft 334 reaches its minimum speed (which occurs when the bush 338 is at the end of the shaft 337 remote from the block 336) it engages the partly formed packet and pushes it out of the pocket 313 into the passage 388 of the unit SU. During this movement the partly formed packet engages the control flaps 389, 390 which start to move in unison with the packet under the control of the driven linkages 393, 394. As the packet is moved further into the passage 388 the panels P2, P7 and P8, P13 are engaged respectively by the resiliently mounted front plates 377, 382 and folded into contact with, and stuck to, panels P4, P5 and P10, P11, to complete the formation of the packet. FIG. 16 shows a perspective view of a completed packet. The flaps 389, 390 are provided to prevent the panels P14 and P19 from bowing as the panels P2, P7, P8, P13 are folded, as explained above. As the packet is moved between the plates 337, 382 the flaps 389, 390 are progressively withdrawn from the passage 388 and brought out of contact with the panels P14 and P19. The packet is moved along the passage 388 by the pusher 323 until the latter reaches the limit of its movement outwards of the drum FD, at which time the speed of the shaft 334 is increasing, and reaches its maximum during part of the pusher's return stroke (i.e. while it is moving back out of the passage 388, and through the aperture 318 in the pocket 313) to allow the drum FD to be rotated through a further step to bring the next partly formed packet to rest at position H. The above sequence of operations is repeated after each stepwise movement of the drum FD so that a column of packets is formed in the passage 388; as each packet is pushed into the passage 388 by the pusher 323, the whole column of packets is moved to the left (as viewed in FIG. 7) along the passage by a distance equal to the width (the dimension measured in the direction the packets are moved through the passage 388) of a packet, i.e. each packet advances one place.

As the packets move intermittently along the passage 388 they pass between the heater blocks 372, 379, the heat causing the hot-melt adhesive, previously applied by the device 359 at position G, to soften. Then whilst the packets are passing along the part of the passage 388 to the left (as viewed in FIG. 7) of the heater blocks 372, 379, the pressure plates 374a, 380 and the side walls 383, 384 combine to act on the packet and ensure that the packet has the required external dimensions, and also that all the corners are right angles.

The heater block 372 is held against the packets passing through the passage 388 by the piston rod 370, which is urged to the right (as viewed in FIG. 8) by air acting on a piston inside the cylinder 371, the piston rod pushing the plate 363 down via the member 368 and stud 369. If for some reason the machine stops the heater block 372 is moved away from the packets by the spring 364, this being made possible by air acting on the piston of the cylinder 371 to move the piston rod 370 to the left (as viewed in FIG. 8). It will be understood that the heater block 379 is moved away from the packets at the same time as, and in a similar manner to, that of the heater block 372.

As each complete packet in turn is pushed out of the left hand end (as viewed in FIG. 7) of the passage 388 (by reason of a partly formed packet being pushed into the passage by the pusher 323) it enters the top of the chute 402, and is finally moved down the latter by the plunger 403 into the packet orientation unit PO.

We claim:

1. Apparatus for folding a packet blank, comprising a cyclically-movable support for conveying blanks one at a time past stationary folder members so that successive edge portions of the blank protruding from the support are folded by engagement with successive ones of the stationary members, in which said support comprises a platform having at least two relatively-movable portions, drive means being provided for moving each of said portions in timed relation to the movement of the other portion or portions so that initially both or all portions of the support are aligned to receive a flat blank and move said blank past a first stationary folder member disposed to engage and fold an edge portion of the blank projecting from one portion of the platform, whereafter said one portion of the platform stops while motion of at least one other portion of the platform continues past another stationary folder member disposed to engage and fold another edge portion of the blank projecting from said other portion of the platform.

2. Apparatus as claimed in claim 1 in which the platform has three portions, comprising a central portion positioned between two outer portions and the drive means is arranged to move said portions cyclically so that in an initial part of the cycle all three portions are moved in synchronism and during a later part of the cycle the movement of the central portion is continued while the outer portions are stationary, a plurality of first folder members being arranged to engage portions of the blank projecting from said outer portions of the platform during said intial part of the cycle and a plurality of other folder members being arranged to engage portions of the blank projecting from the central part of the platform during said later part of the cycle.

3. Apparatus as claimed in claim 1 in which said first folder members comprise folders and tuckers.

4. Apparatus for folding a packet blank comprising first and second stationary folder members to initiate folding of the blank, a platform for supporting the blank and movable past said first and second stationary folder members, said platform having at least two parts movable relative to one another, drive means operative to move said parts in aligned relationship, after receipt of the blank of the platform, through a predetermined distance past said first stationary member positioned to engage and fold an edge portion of the blank projecting from one part of the platform, said drive means after effecting movement over said distance being operable to continue moving at least another part of the platform past said second stationary member, which is disposed to engage and fold another edge portion of the blank projecting from said other part, while leaving said one part stationary.

5. Apparatus for folding a blank of a packet, in particular a hinged lid cigarette packet, comprising first and second folders which are stationary and spaced apart for successively folding edge portions of the blank during movement thereof, a movable platform having at least two sections for supporting the blank, the sections having supporting surfaces parallel to one another and being movable relative to one another in a direction perpendicular to said supporting surfaces, and drive means operable cyclically to move all the sections of the platform past the first folder and to continue moving at least one section of the platform past the second folder while leaving at least one of the other sections stationary.

6. Apparatus as claimed in claim 5 in which said movable platform comprises two outer sections connected together and a central section lying between the two outer sections, the central section being pivotally connected by a first link to a second link which in turn is pivotally connected to the outer sections, the first and second links being non-aligned and one end of the second link being pivotally connected to a first link by a shaft which is constrained to move along a slot consisting of a straight part and an arcuate part, the arcuate part having a middle radius corresponding to the effective length of the second link with a centre at the end of the locus of the other end of the second link, so that while the shaft is moving along the straight part of the slot all the sections of the platform move in synchronism, and while the shaft is moving along the arcuate part of the slot the second link is rotated about said centre, thus preventing movement of the two outer sections.

7. Apparatus according to claim 5 further comprising a pair of lifting plates which are pivotable in timed relation with the drive means and operable to support further portions of the blank during movement past the first folder.

* * * * *